United States Patent
Weber

(10) Patent No.: US 7,587,624 B1
(45) Date of Patent: Sep. 8, 2009

(54) METHOD AND APPARATUS FOR TELECOMMUNICATION RELIABILITY BY MEDIA CONNECTIVITY ENDPOINT SELECTION OF A CONTROL ENTITY

(75) Inventor: Gregory D. Weber, Westminster, CO (US)

(73) Assignee: Avaya Inc, Basking Ridge, NJ (US)

( * ) Notice: Subject to any disclaimer, the term of this patent is extended or adjusted under 35 U.S.C. 154(b) by 469 days.

(21) Appl. No.: 11/412,567

(22) Filed: Apr. 27, 2006

(51) Int. Cl.
*G06F 11/00* (2006.01)
(52) U.S. Cl. ............................................ 714/4; 370/250
(58) Field of Classification Search ...................... 714/4, 714/1, 44; 370/218, 219, 248, 250, 360, 370/351, 444
See application file for complete search history.

(56) References Cited

U.S. PATENT DOCUMENTS

| | | | |
|---|---|---|---|
| 6,564,051 B2* | 5/2003 | Struhsaker et al. | 455/423 |
| 6,687,245 B2* | 2/2004 | Fangman et al. | 370/356 |
| 7,272,746 B2* | 9/2007 | Deerman et al. | 714/4 |
| 7,274,684 B2* | 9/2007 | Young et al. | 370/352 |
| 2003/0093563 A1* | 5/2003 | Young et al. | 709/245 |

* cited by examiner

*Primary Examiner*—Dieu-Minh Le
(74) *Attorney, Agent, or Firm*—John C. Moran

(57) ABSTRACT

A method and apparatus for assuring telecommunication reliability by receiving from each of a plurality of control entities factors concerning priority of each of the plurality of control entities; determining a priority score for each of the plurality of control entities; detecting lose of communication with a one of the plurality of control entities from which the media connectivity endpoint presently receives control information; selecting another one of the plurality of control entities having the highest priority score; and requesting the selected other one of the plurality of control entities to supply control information.

30 Claims, 6 Drawing Sheets

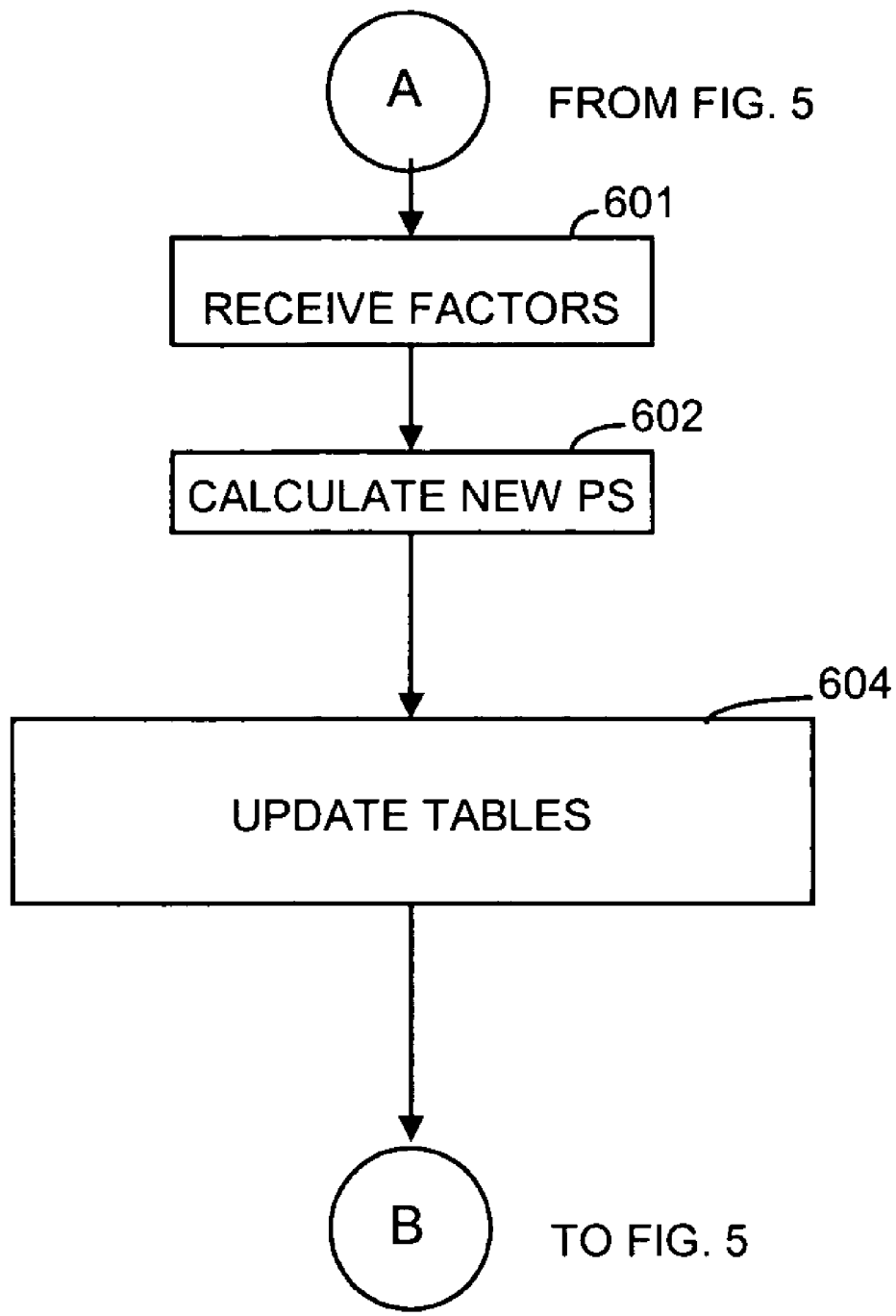

METHOD AND APPARATUS FOR TELECOMMUNICATION RELIABILITY BY MEDIA CONNECTIVITY ENDPOINT SELECTION OF A CONTROL ENTITY

TECHNICAL FIELD

This invention relates to reliability in telecommunication via a distributed telecommunication switching system.

BACKGROUND

Within the prior art, it is known to provide telecommunication service by a distributed telecommunication system using port networks (also referred to as media connectivity gateways) that are distributed over a geographical area with the port networks communicating media information via either the Internet or another type of wide area network. Control for the distributed port networks is provided by a gatekeeper also referred to as a switching processing element (SPE). For reliability, it is known to provide duplicated computers to perform the functions of the SPE. One computer is considered the active computer and the other computer is considered the standby computer which is capable of assuming control should the active computer fail. Although the use of duplicating computers to perform the SPE function does increase reliability, it does not solve certain failure problems. For example, the site where the SPE is located may experience an extreme disaster so that the SPE is eliminated as a functioning unit. In addition, since control is transmitted over the Internet, it is possible due to network fragmentation that a SPE may not be able to maintain control over one or more distributed port networks.

SUMMARY OF THE INVENTION

A method and apparatus for assuring telecommunication reliability by receiving from each of a plurality of control entities factors concerning priority of each of the plurality of control entities; determining a priority score for each of the plurality of control entities; detecting lose of communication with a one of the plurality of control entities from which the media connectivity endpoint presently receives control information; selecting another one of the plurality of control entities having the highest priority score; and requesting the selected other one of the plurality of control entities to supply control information.

BRIEF DESCRIPTION OF THE DRAWING

FIGS. 5 and 6 illustrate, in flowchart form, operations performed by a server interface module of an IPSI.

DETAILED DESCRIPTION

Figure 1:
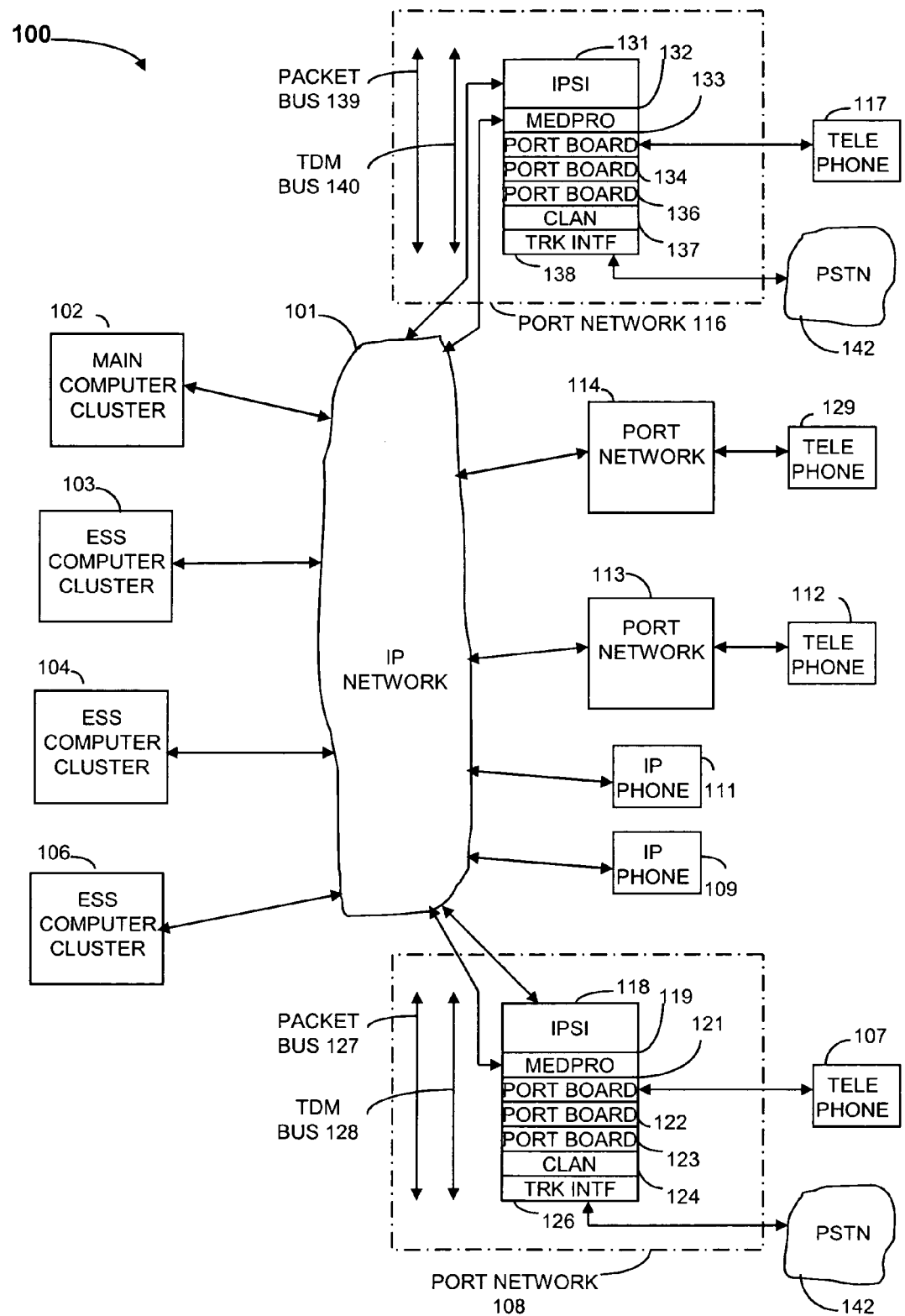
FIG. 1 illustrates, in block diagram form, an embodiment of the invention.

The embodiment illustrated in FIG. 1 illustrates distributed telecommunication system 100 that has multiple computer clusters for controlling the overall operations of distributed telecommunication system 100. The switch processing element functions can be performed by main computer cluster 102, and ESS computer clusters 103-106. These computer clusters are interconnected to port networks 108, 113, 114, and 116.

The port networks allow telecommunication operations to be provided to digital or analog telephones 107, 112, 117, and 129. The port networks utilize port boards to interface the telephones so that the telephones can be controlled and communicate audio and other media information via IP network 101. In the case of IP phones 109 and 111, these phones also may be controlled via the port networks by the IP phone establishing control and media paths through the IP network to a control LAN (CLAN) board within a port network such as CLAN 124. In addition, the switching processor entity can directly control an IP phone. Trunk interface boards, such as trunk interface board 126, interconnect port networks with the public switching telephone network (PSTN) 142.

Port network 108 utilizes IPSI 118 to establish from which computer cluster it will receive control information. Media processor (MEDPRO) 119 transfers media information such as voice from and to IP network 101. MEDPRO 119 also makes any necessary protocol conversions. Elements 118-126 of port network 108 communicate control information via packet bus 127 and media information as well as certain control information via TDM bus 128. Whether one of boards 121-126 receives control information via packet bus 127 or TDM bus 128 depends on the design of the board. Port networks 113, 114, and 116 are similar in design to port network 108. One skilled in the art would realize that there could be a variety of combinations of port boards, trunk interface boards, and CLAN boards.

During normal operation, main computer cluster 102 controls the operation of the distributed telecommunication system 100 as illustrated in FIG. 1. Main computer cluster 102 may advantageously consist of an active computer and a standby computer. The active computer continuously keeps the standby computer up to date on the status of all calls that are set up through the telecommunication and keeps the standby computer updated on the status of buttons and indicators on the various telephones. In addition, the active computer periodically transmits to ESS computer clusters 103-106 updates of static translation information. As will be described, if main computer cluster 102 should fail, one or more of the ESS computer clusters will assume the operations of providing the switching processing entity operations. In addition, although IP network 101 appears to be a single entity, in reality it is comprised of various routers, the failure of certain routers can make it impossible for main computer cluster 102 to communicate with one or more port networks. In that case, the IPSI of the port network will initiate a service request to an ESS computer cluster to receive control information.

During normal operations, the ESS computer clusters connect to all IPSIs within the port networks which are media connectivity endpoints and transmit to the IPSIs the factors that the IPSIs are to utilize in case communication with main computer cluster 102 is lost. Utilizing these factors, the IPSIs dynamically create priority lists of backup ESS computer clusters that each IPSI will attempt to establish communication with and receive control from should main computer cluster 102 fail. If an IPSI is not receiving control information from an ESS computer cluster or the main computer cluster 102, it will request control from the main computer cluster 102 or an ESS computer cluster based on the highest ranked cluster in the priority list that the IPSI has created and the fact that the IPSI is in communication with the selected computer cluster. Each IPSI is dynamically changing its priority list based on the connectivity changes occurring in IP network 101 and failures within the computer clusters. After a failure has been rectified, main computer cluster 102 has the ability to override control by any ESS computer cluster of an IPSI.

An IP phone, such as IP phone 109, can be assigned to receive control information via a single CLAN board such as CLAN board 124 or the IP phone can receive factors from various CLAN boards. If the IP phone receives factors from various CLAN boards, this allows the IP phone to create a priority list that determines which CLAN board the IP phone will attempt to communicate with in order to receive control information if the IP phone determines that it is no longer in communication with a previously selected CLAN. If an IP phone is receiving its control directly from the switching processing element, than the IP phone will create a priority list for each of the computer clusters. When an IP phone uses a priority list for selection of either a CLAN or the switching processing element, the IP phone functions as a media connectivity endpoint.

Figure 2:
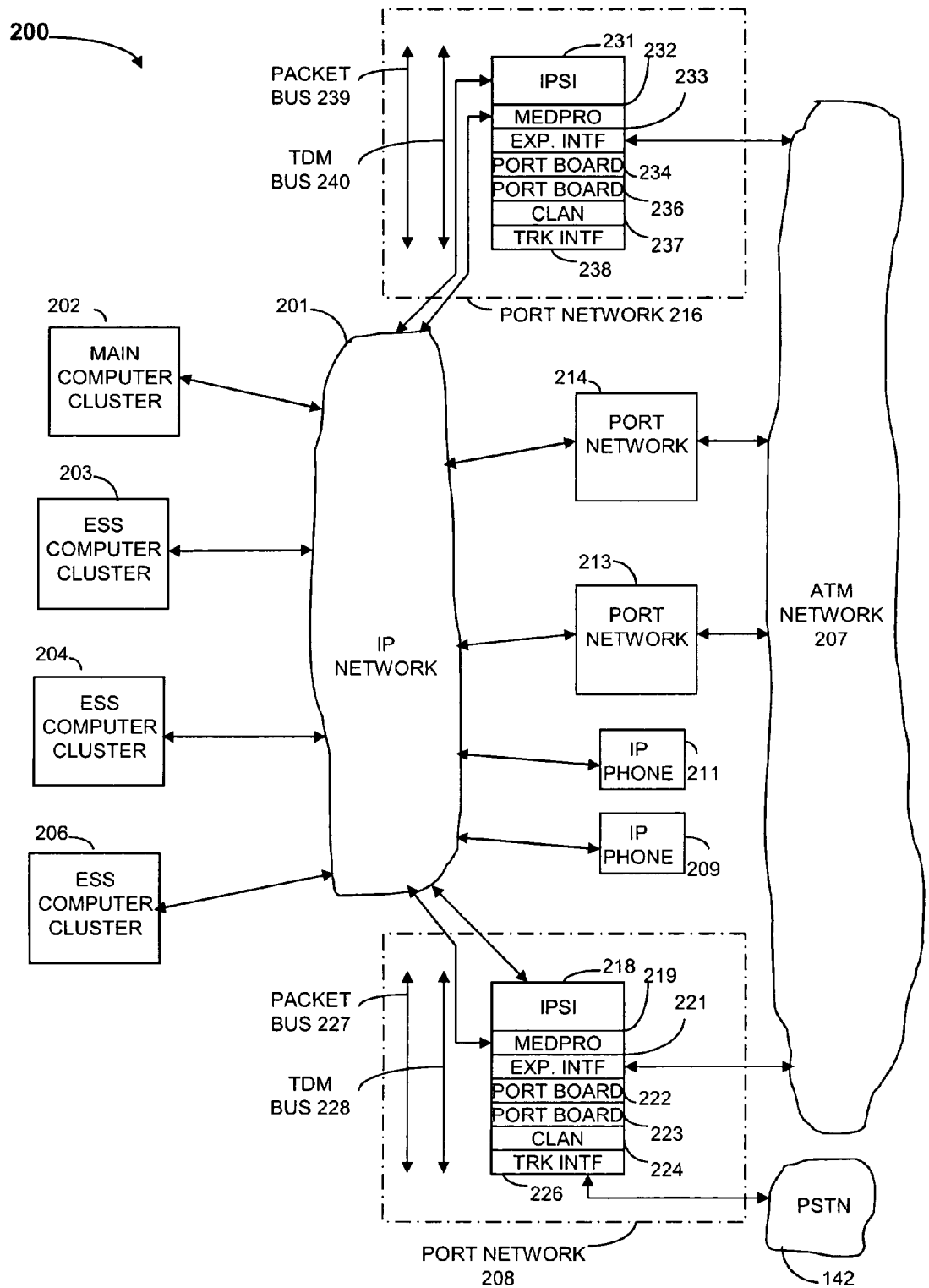
FIG. 2 illustrates, in block diagram form, another embodiment of the invention.

FIG. 2 illustrates another embodiment which is distributed telecommunication switching system 200. Distributed telecommunication switching system 200 functions in a manner similar to distributed telecommunication switching system 100 with respect to the operations of the computer clusters and telephones. Note, that no analog or digital telephones are illustrated as being interconnected to the port networks, however this was simply done for convenience on FIG. 2. The principal difference in the operation of distributed telecommunication system 200 from that of distributed telecommunication system 100 is that the media of a call is transmitted via ATM network 207. The call control continues to be communicated via IP network 201. The port networks 208, 213, 214, and 216 differ from the port networks of FIG. 1 in that an expansion interface, such as expansion interface 221, has been added to the port networks in order to interface and communicate via ATM network 207. In addition, an IP phone such as IP phone 209 will always utilize a CLAN such as CLAN 224 for establishing and controlling telecommunication calls.

Figure 3:
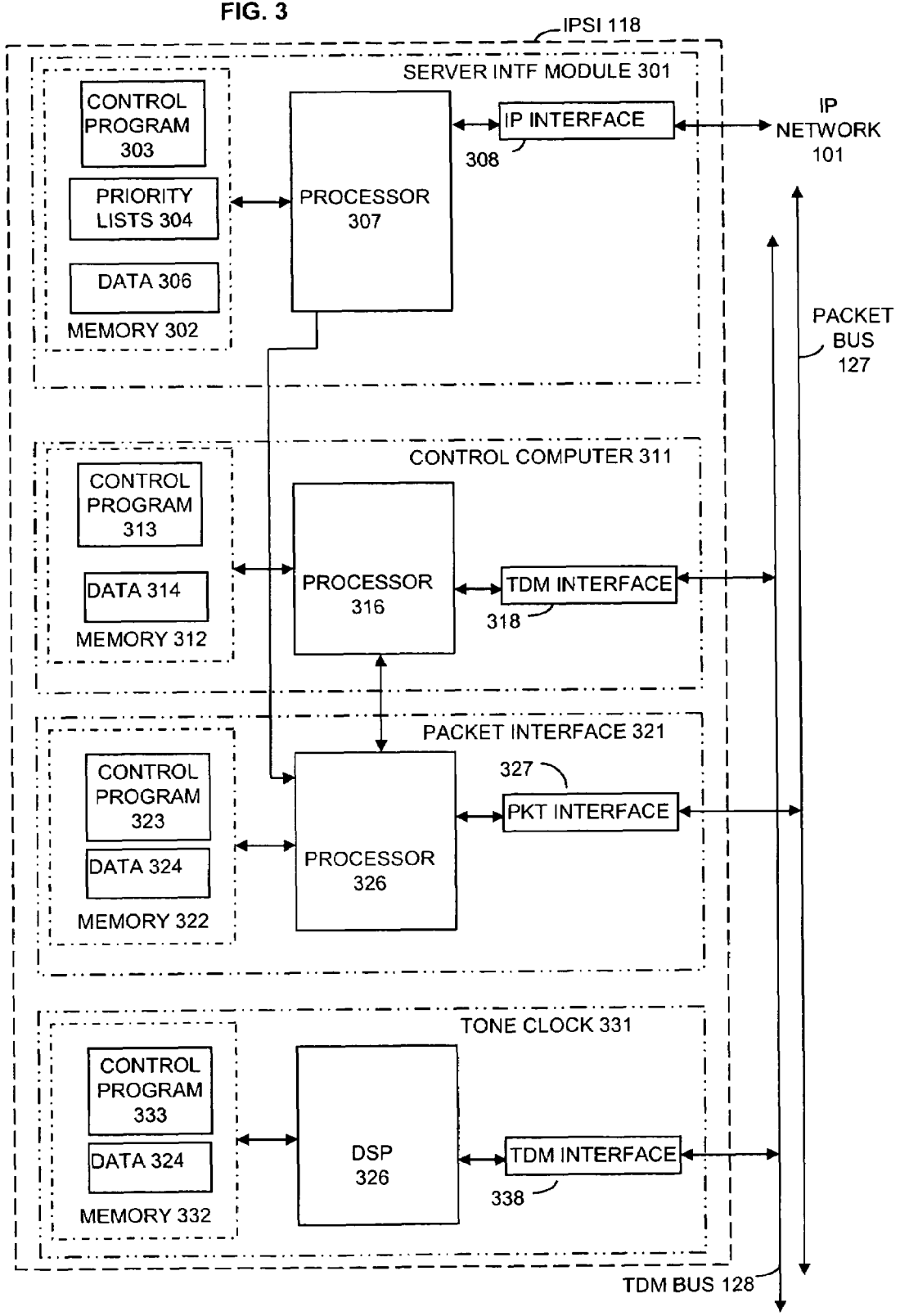
FIG. 3 illustrates, in block diagram form, additional details of an IPSI.

FIG. 3 illustrates in greater detail IPSI 118 of port network 108 of FIG. 1. The other IPSIs units would be similar in design. Server interface module (SIM) 301 communicates control information with the switching processing element via IP network 101. Depending on whether a port board port network 108 that is being controlled communicates control information via packet bus 127 or TDM bus 128, SIM 301 communicates control information with either packet interface 321 or control computer 311, respectively. Processor 307 controls the operation of SIM 301 by execution of programs stored in control program module 303 using data stored in priority lists 304 and data module 306 of memory 302. Processor 307 interfaces to IP network 101 via IP interface 308, interfaces to packet bus 127 via packet interface 321 and interfaces to TDM bus 128 via control computer 311. The operation of processor 307 in determining which computer cluster to designate as the switching processor entity utilizing information stored in priority lists 304 is described in greater detail in a later section.

Control computer 311 communicates all control information received from or transmitted to SIM 301 via TDM bus 128. Control computer 311 performs its operations by processor 316 executing programs from control program module 313 using data in data module 314 of memory 312. Processor 316 interfaces to TDM bus 128 via TDM interface 318.

Packet interface 321 communicates all control information received from or transmitted to SIM 301 via packet bus 127. Packet interface 321 performs its operations by processor 326 executing programs from control program module 323 using data in data module 324 of memory 322. Processor 326 interfaces to packet bus 127 via packet interface 327.

Tone clock 331 provides tone information and clock information for the port network by DSP 326 executing programs from control program module 331 utilizing data in data module 324 of memory 332 using techniques well known to those skilled in the art. DSP 326 interfaces to TDM bus 128 via TDM interface 338. DSP 326 communicates control and media information via TDM bus 128.

In order for an IPSI to determine from which computer cluster the IPSI is to accept control, the IPSI maintains a priority score for each computer cluster to which the IPSI is currently connected. Table I below illustrates the information that is maintained for each computer cluster in a table which is stored in the priority list of the server interface module.

TABLE I

| INDEX (i) | FACTOR TYPE | FACTOR WEIGHT (w) | FACTOR VALUE (v) |
|---|---|---|---|
| 1 | base score | 1 | administered base score (1-100) |
| 2 | local preference boost | 250 | 0—if not in the same community or boost not enabled<br>1—if in the same community and boost enabled |
| 3 | system preference boost | 500 | 0—if boost is not enabled<br>1—if boost is enabled |
| 4 | main cluster boost | 1000 | 0—if an ESS computer cluster<br>1—if the main computer cluster |

Upon a computer cluster establishing communication with an IPSI, the computer cluster transmits to the IPSI the factor values (v) as well as the factor values (v) which are stored in the priority list maintained by the server interface module. Within Table I, the columns headed Factor Type and Index are not directly transmitted by the computer cluster to the IPSI. One skilled in the art could readily envision that other factors could be transmitted by the computer cluster. The column headed Factor Type is included for illustration purposes only and the index is implied from the transmitted order of the of the values for "w" and "v".

To determine the priority score (PS), the processor of the server interface module calculates the following formula for each connected computer cluster.

$$PS = \Sigma w_i v_i \qquad \text{Equation 1}$$

Where i=1-4

One skilled in the art would also realize that the values given for the Factor Weights of Table I are strictly for example purposes and other weights could be utilized. If a computer cluster is the main computer cluster, it is given the main cluster boost of 1000 as illustrated in Table I. The main cluster boost assures that regardless of what the other factor weights result from evaluation of Equation 1, the main computer cluster will still have the highest priority score, and the IPSI will select the main computer cluster for control. The system preference boost is set so that it will override the combination of the local preference boost and base score. This will result in the computer cluster that has been designated as having the system preference boost being selected by the IPSI as the controlling computer cluster absent the IPSI not being able to connect to the main computer cluster.

An ESS computer cluster is given the system preference boost for a variety of reasons. Some of these reasons may be, but are not limited to, the fact that the ESS computer cluster has surplus processing power or is particularly well connected to the IP network 101 via preferred packet routers.

The local preference boost is given to an ESS computer cluster that topologically is local to the IPSI. This means that the ESS computer cluster is close to the IPSI from a network perspective. For example, the ESS computer cluster may reside on the same local area network as the IPSI. The base score factor type is assigned to an ESS computer cluster based on the factors such as location, through-put, user preference, and reliability. Note, one skilled in the art could envision other reasons for assigning specific base scores to a given ESS computer cluster.

It is important to realize that if an IPSI is not in communication with a given computer cluster, the IPSI will not evaluate Equation 1 to determine the priority score for that computer cluster.

Figure 4:
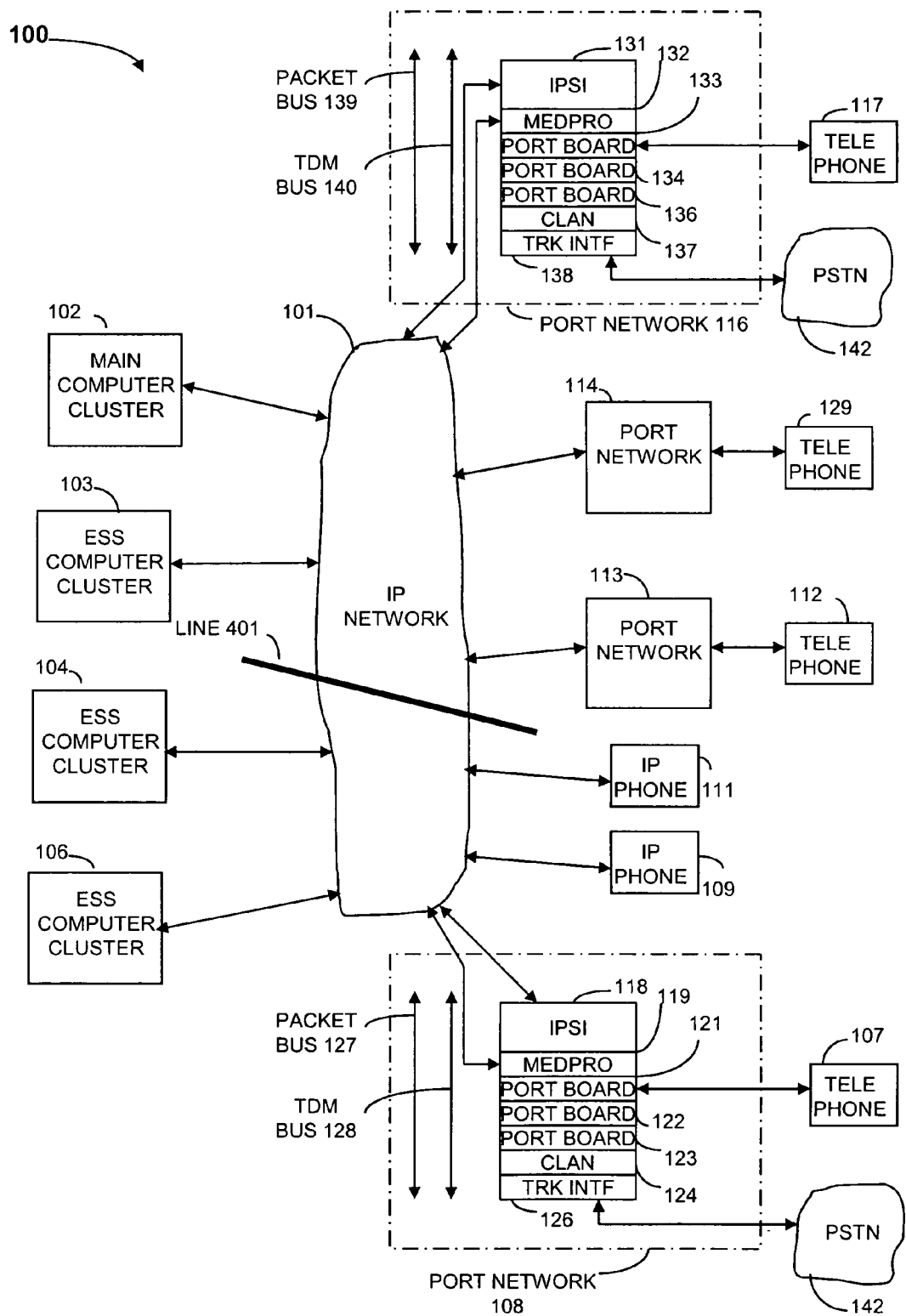
FIG. 4 illustrates, in block diagram form, the fragmentation of the IP network 101 of distributed telecommunication system 100 of FIG. 1.

In order to understand how an IPSI utilizes a priority score to select between computer clusters, consider the following example. FIG. 4 illustrates that distributed telecommunication switching system 100 has suffered a fragmentation of IP network 101. Port network 108 is isolated from main computer cluster 102 and ESS computer cluster 103. The only computer clusters that port network 108 can communicate with are ESS computer clusters 104 and 106. The following Tables II and III illustrate the factor values that IPSI 118 has stored for ESS computer cluster 104 and 106.

TABLE II for ESS Computer Cluster 106

| INDEX (i) | FACTOR TYPE | FACTOR WEIGHT (w) | FACTOR VALUE (v) |
|---|---|---|---|
| 1 | base score | 1 | 100 |
| 2 | local preference boost | 250 | 1 |
| 3 | system preference boost | 500 | 0 |
| 4 | main cluster boost | 1000 | 0 |

TABLE III for Ess Computer Cluster 106

| INDEX (i) | FACTOR TYPE | FACTOR WEIGHT (w) | FACTOR VALUE (v) |
|---|---|---|---|
| 1 | base score | 1 | 10 |
| 2 | local preference boost | 250 | 0 |
| 3 | system preference boost | 500 | 1 |
| 4 | main cluster boost | 1000 | 0 |

If the information for computer cluster 104 from Table II is inserted into Equation 1, the resulting priority score is 350. If the factor values for ESS computer cluster 106 are taken from Table III and inserted into Equation 1, the resulting priority score is 510. Based on the priority scores, IPSI 118 will select ESS computer cluster 106 to receive control information from. Once IP network 101 is no longer fragmented, IPSI 118 is responsive to communication being established with main computer cluster 102 to store this fact and give main computer cluster 102 top priority in the list. After a long period of time has elapsed since the fragmentation, IPSI 118 may switch to main computer cluster 102 for control information. Manual intervention can force IPSI 118 to switch to main computer cluster 102 for control information. In addition, main computer cluster 102 can transmit a command to IPSI 118 that will force IPSI 118 to switch to main computer cluster 102 for control information.

While main computer cluster 102 is performing the functions of a switching processing element, it transmits on a periodic basis to each of the ESS computer clusters static translation information concerning distributed telecommunication system 100. In this manner, if it becomes necessary for an ESS computer cluster to start to perform the functions of a switching processor entity, the ESS computer cluster will have the information necessary to perform this function. In addition, each computer cluster constantly transmits a short message to each of the IPSIs to which the IPSIs respond. This establishes for both the computer clusters and the IPSI that communication is still existing between the two units.

Figure 5:
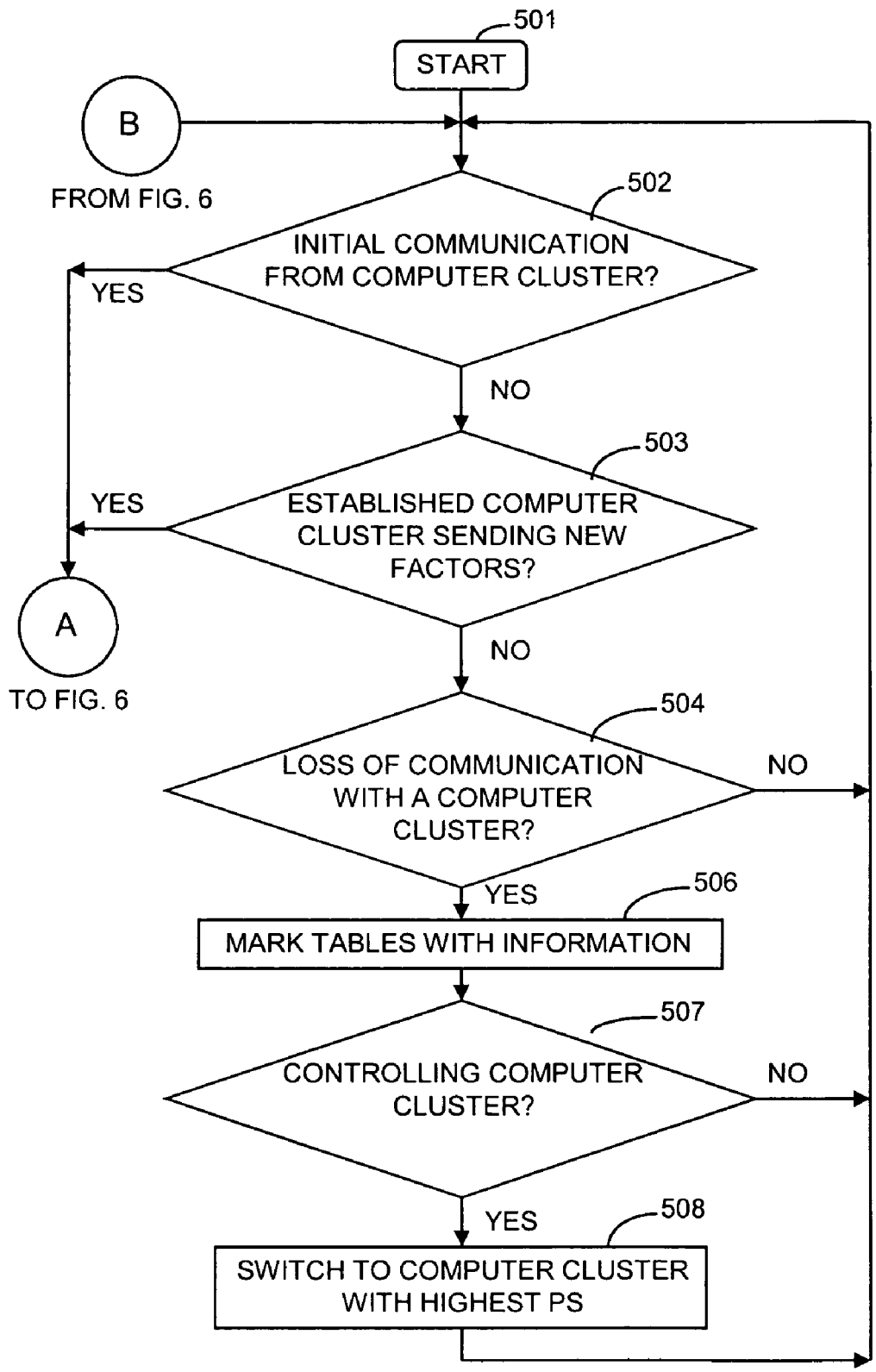

FIGS. 5 and 6 illustrate, in flowchart form, operations performed by a server interface module to enable the selection of a computer cluster for control. After being started in block 501, decision block 502 determines if there is an initial communication from a computer cluster. If the answer is yes, control is transferred to block 601 of FIG. 6. If the answer is no in decision block 502, decision block 503 determines if a computer cluster with which communication is already established is sending new factors. If the answer is yes, control is transferred to decision block 601 of FIG. 6. If the answer is no in decision block 503, control is transferred to decision block 504.

Decision block 504 determines if communication has been lost with a computer cluster. If the answer is no, control is transferred back to decision block 502. If the answer is yes, this information is marked in the tables maintained by the server interface module and control is transferred to decision block 507.

Decision block 507 determines if the computer cluster that failed was the controlling computer cluster. If the answer is no, control is transferred back to decision block 502. If the answer is yes in decision block 507, block 508 switches to the computer cluster with the highest PS before returning control back to decision block 502.

If the answer is yes in either decision block 502 or 503, control is transferred to block 601 of FIG. 6. Block 601 receives the factors that are being transmitted by the computer cluster, and block 602 calculates a new PS for that computer cluster.

Block 604 updates the tables before transferring control back to decision block 502 of FIG. 5.

When the operations of a telephone set, control computer, processor or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The telephone set, control computer, processor or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the telephone set, control computer or server is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for telecommunication reliability, comprising the steps of:
    receiving by a media connectivity endpoint from each of a plurality of control entities factors concerning priority of each of the plurality of control entities;
    determining by the media connectivity endpoint a priority score from the received factors for each of the plurality of control entities;
    detecting by the media connectivity endpoint lose of communication with a one of the plurality of control entities from which the media connectivity endpoint presently receives control information;
    selecting by the media connectivity endpoint another one of the plurality of control entities having the highest priority score; and
    requesting the selected other one of the plurality of control entities to supply control information.

2. The method of claim 1 wherein the step of selecting comprises the step of switching to the other one of the plurality of control entities only if the media connectivity endpoint presently has communication with the other one of the plurality of control entities.

3. The method of claim 2 wherein the step of selecting further comprises the step of periodically checking for communication with each of the plurality of control entities.

4. The method of claim 2 wherein the media connectivity endpoint is a media gateway.

5. The method of claim 2 wherein the media connectivity endpoint is an IP phone.

6. The method of claim 2 wherein each of the plurality of control entities comprises two computers operating in an active and standby mode.

7. The method of claim 2 wherein a first factor defines the base weight of a transmitting one of the plurality of control entities.

8. The method of claim 7 wherein the media connectivity endpoint is part of a group of media connectivity endpoints and a second factor of the factors defines a preference weight for a local one of the plurality of control entities that is local to the group where the second factor is greater than the first factor for all media connectivity endpoints in the group or the second factor has a value of zero.

9. The method of claim 8 wherein a third factor of the factors defines a system preference weight for a one of the plurality of control entities with which all media connectivity endpoints can normally communicate wherein the third factor is greater than the sum of the first and second factors for all media connectivity endpoints in a system of media connectivity endpoints or the third factor has a value of zero.

10. The method of claim 9 wherein a fourth factor is greater than the sum of the first, second, and third factors for all media connectivity endpoints in a system of media connectivity endpoints or the fourth factor has a value of zero.

11. A method for selecting one of a plurality of control entities to provide control for one or more of a plurality of media connectivity endpoints of a telecommunication system, comprising the steps of:
    attempting to establish communication with each of the plurality of media connectivity endpoints by each of the plurality of control entities;
    transmitting by each of the plurality of control entities to each of the plurality of media connectivity endpoints with which communication has been established factors that define a priority score for each of the plurality of control entities; and
    providing control by one of the plurality of control entities to one of the plurality of media connectivity endpoints upon receipt of a service request from the one of the plurality of media connectivity endpoints.

12. The method of claim 11 wherein a first factor defines the base weight of the transmitting one of the plurality of control entities.

13. The method of claim 12 wherein ones of media connectivity endpoints are part of a group of the plurality of media connectivity endpoints and a second factor of the factors defines a preference weight for a local one of the plurality of control entities that is local to the group where the second factor is greater than the first factor for all of the plurality of media connectivity endpoints in the group or the second factor has a value of zero.

14. The method of claim 13 wherein a third factor of the factors defines a system preference weight for another one of the plurality of control entities with which all of the plurality of media connectivity endpoints can normally communicate wherein the third factor is greater than the sum of the first and second factors for all media connectivity endpoints in the telecommunication system or the third factor has a value of zero.

15. The method of claim 14 wherein a fourth factor is greater than the sum of the first, second, and third factors for all media connectivity endpoints in a system of media connectivity endpoints or the fourth factor has a value of zero.

16. A computer-readable storage medium for providing telecommunication reliability, comprising computer-executable instructions configured for:
    receiving by a media connectivity endpoint from each of a plurality of control entities factors concerning priority of each of the plurality of control entities;

determining by the media connectivity endpoint a priority score from the received factors for each of the plurality of control entities;

detecting by the media connectivity endpoint lose of communication with a one of the plurality of control entities from which the media connectivity endpoint presently receives control information;

selecting by the media connectivity endpoint another one of the plurality of control entities having the highest priority score; and requesting the selected other one of the plurality of control entities to supply control information.

17. The computer-readable storage medium of claim 16 wherein the computer-executable instructions for selecting comprise the computer-executable instructions for switching to the other one of the plurality of control entities only if the media connectivity endpoint presently has communication with the other one of the plurality of control entities.

18. The computer-readable storage medium of claim 17 wherein the computer-executable instructions for selecting further comprise the computer-executable instructions for periodically checking for communication with each of the plurality of control entities.

19. The computer-readable storage medium of claim 17 wherein the media connectivity endpoint is a media gateway.

20. The computer-readable storage medium of claim 17 wherein the media connectivity endpoint is an IP phone.

21. The computer-readable storage medium of claim 17 wherein each of the plurality of control entities comprise two computers operating in an active and standby mode.

22. The computer-readable storage medium of claim 17 wherein a first factor defines the base weight of a transmitting one of the plurality of control entities.

23. The computer-readable storage medium of claim 22 wherein the media connectivity endpoint is part of a group of media connectivity endpoints and a second factor of the factors defines a preference weight for a local one of the plurality of control entities that is local to the group where the second factor is greater than the first factor for all media connectivity endpoints in the group or the second factor has a value of zero.

24. The computer-readable storage medium of claim 23 wherein a third factor of the factors defines a system preference weight for a one of the plurality of control entities with which all media connectivity endpoints can normally communicate wherein the third factor is greater than the sum of the first and second factors for all media connectivity endpoints in a system of media connectivity endpoints or the third factor has a value of zero.

25. The computer-readable storage medium of claim 24 wherein a fourth factor is greater than the sum of the first, second, and third factors for all media connectivity endpoints in a system of media connectivity endpoints or the fourth factor has a value of zero.

26. A computer-readable storage medium for selecting one of a plurality of control entities to provide control for one or more of a plurality of media connectivity endpoints of a telecommunication system, comprising computer-executable instructions configured for:

attempting to establish communication with each of the plurality of media connectivity endpoints by each of the plurality of control entities;

transmitting by each of the plurality of control entities to each of the plurality of media connectivity endpoints with which communication has been established factors that define a priority score for each of the plurality of control entities; and providing control by one of the plurality of control entities to one of the plurality of media connectivity endpoints upon receipt of a service request from the one of the plurality of media connectivity endpoints.

27. The computer-readable storage medium of claim 26 wherein a first factor defines the base weight of the transmitting one of the plurality of control entities.

28. The computer-readable storage medium of claim 27 wherein ones of media connectivity endpoints are part of a group of the plurality of media connectivity endpoints and a second factor of the factors defines a preference weight for a local one of the plurality of control entities that is local to the group where the second factor is greater than the first factor for all of the plurality of media connectivity endpoints in the group or the second factor has a value of zero.

29. The computer-readable storage medium of claim 28 wherein a third factor of the factors defines a system preference weight for another one of the plurality of control entities with which all of the plurality of media connectivity endpoints can normally communicate wherein the third factor is greater than the sum of the first and second factors for all media connectivity endpoints in the telecommunication system or the third factor has a value of zero.

30. The computer-readable storage medium of claim 29 wherein a fourth factor is greater than the sum of the first, second, and third factors for all media connectivity endpoints in a system of media connectivity endpoints or the fourth factor has a value of zero.

* * * * *